United States Patent [19]

O'Neil et al.

[11] 4,014,362
[45] Mar. 29, 1977

[54] SIMPLIFIED BALANCE VALVE STEAM TRAP

[75] Inventors: Eugene E. O'Neil; Robert H. Healy; Anneus E. Eygabroad, all of Marshall, Iowa

[73] Assignee: Dunham-Bush, Inc., West Hartford, Conn.

[22] Filed: Sept. 22, 1975

[21] Appl. No.: 615,637

[52] U.S. Cl. .............................. 137/196; 137/434; 137/450
[51] Int. Cl.² .......................................... F16T 1/20
[58] Field of Search .......... 137/196, 450, 192, 434, 137/445; 251/252

[56] References Cited

UNITED STATES PATENTS

| | | | |
|---|---|---|---|
| 2,399,111 | 4/1946 | George | 137/196 |
| 3,162,209 | 12/1964 | Gaines | 137/450 X |

*Primary Examiner*—Alan Cohan
*Attorney, Agent, or Firm*—Sughrue, Rothwell, Mion, Zinn & Macpeak

[57] ABSTRACT

A T-shaped pipe whose base extends through a sidewall of a steam trap housing terminates internally of the housing in open ended upper and lower vertical arms. The lower arm is closed off by an axially movable valve disc mounted to a valve actuator rod extending axially through the arms and coupled at its upper end to a pressure balancing plate sealably connected at its periphery by a non-ferrous metal bellows to the upper end of the T-pipe arm. A float ball fixed to a float arm is pivotably coupled at the opposite end of the arm to the valve actuator rod and to the T-pipe with the pressure on balancing plate balancing the pressures acting on the movable valve disc.

2 Claims, 2 Drawing Figures

4,014,362

SIMPLIFIED BALANCE VALVE STEAM TRAP

BACKGROUND OF THE INVENTION

1. Field of the Invention

This invention relates to steam traps and more particularly to a simplified pressure balancing mechanism for the condensate outlet valve of the steam trap.

Steam traps conventionally employ a float responsive to the accumulation of liquid condensate for periodically opening a condensate outlet valve to discharge accumulated liquid condensate. Because of the relatively high pressure differential between the interior of the steam trap housing and the condensate outlet, the opening and closing of the outlet valve must be accomplished against relatively large pressure. This requires a large float and a long float arm to create power sufficient to open the valve against a particularly large internal pressure within the steam trap housing.

It is an object of the present invention to provide an improved, simplified and compact steam trap in which the movable condensate outlet valve is provided with pressure balancing means to insure that the pressure differential between the condensate outlet passage and the interior of the steam trap housing is balanced under valve closed conditions such that the float size may be reduced, the size of the float may be kept to a minimum without detrimentally affecting the ability of the valve to open upon accumulation of a predetermined volume of liquid condensate.

SUMMARY OF THE INVENTION

In the steam trap which comprises an imperforate housing including means forming an upper steam inlet passage and a lower condensate outlet passage, and wherein the outlet passage includes a fixed annular valve seat and a valve disc is mounted for axial movement towards and away from the outlet passage valve seat by way of a valve rod which rod is fixed at one end to the valve disc and extends within the outlet passage and a float arm is pivotably connected at one end to the valve rod carries a float at the other end within the steam trap housing and is pivotable about a fixed axis intermediate of its end, the improvement comprises a pressure balancing plate fixed to the valve rod and movable therewith and means for sealably exposing one side of the plate to the outlet passage and the other side to the housing interior to balance the pressures acting on valve disc and permit its operation by a minimal sized float pivoted on a relatively short float arm.

Preferably, the outlet passage means comprises a T-shaped pipe including a horizontal outlet base portion extending through a sidewall of the housing and vertical right angle arms opening into the housing interior, above and below the base portion. The end of the lower arm defines the annular valve seat, the float arm is sealably pivotably mounted within one of said arms and is pivotably connected to the valve rod which extends vertically through both arms, coupled at its lower end to the valve disc and coupled at its upper end to said pressure balancing plate. A tubular metal bellows concentrically surrounds the upper end of the valve rod and is sealably connected at its lower end to the upper end of the vertical upper arm of the T-shaped pipe and at its upper end to the periphery to the pressure balancing plate.

DESCRIPTION OF THE PREFERRED EMBODIMENT

Figure 2:
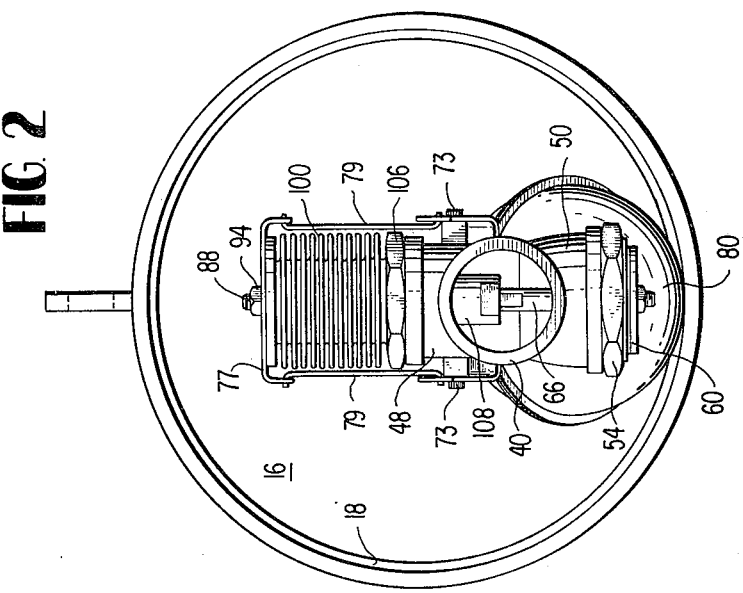
FIG. 2 is a sectional elevation thereof taken about lines II — II of FIG. 1.
Figure 1:
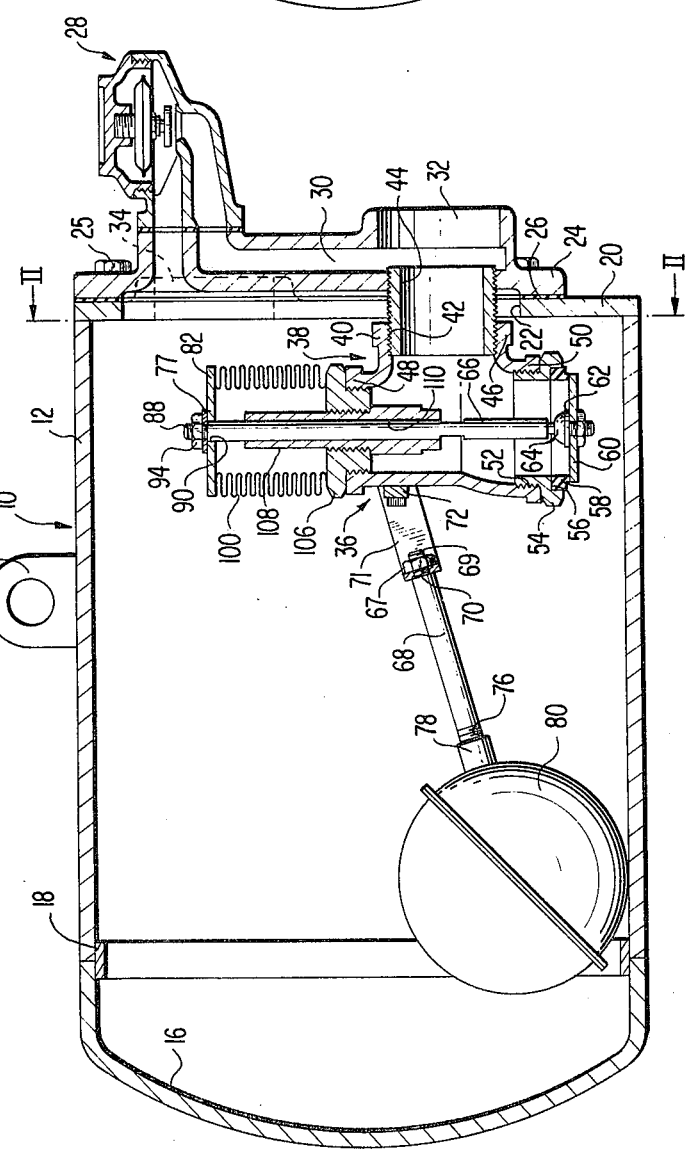
FIG. 1 is a vertical sectional view of the improved balance valve steam trap of the present invention in valve closed position.

Referring to the drawing, the balance valve steam trap of the present invention comprises an imperforate steam trap housing or casing identified generally at 10 consisting of a cylindrical section 12 supporting an apertured mounting tab 14 permitting the steam trap to be fixedly mounted to a support (not shown), and having sealably coupled at its left hand end a dome-shaped cap 16 which may be suitably welded thereto, reinforced by a ring 18 on the interior surface of the cap and cylindrical housing section 12. The cylindrical housing section 12 terminates at its right hand end in a vertical, integral endwall 20 which is provided with an irregular opening 22, this opening 22 being covered by an end plate 24 mounted thereto by suitable screws 25 and sealed by way of gasket 26. The end plate 24 carries a normally closed thermostatic pressure relief valve indicated generally at 28 and forming no part of the present invention, but which does permit air to be discharged through an air by-pass passage 30 to a condensate outlet opening 32 formed within the end plate 24 below the thermostatic relief valve 28. The end plate 24 is further provided with a condensate inlet opening 34 which permits steam to enter the housing 10 for condensing therein. These elements are conventional to steam traps in general, the function of the steam trap being to permit the accumulated condensed water to be periodically discharged through the condensate outlet 32.

The present invention is directed to the provision of a balanced condensate outlet vave of simplified construction and permitting the size of the steam trap to be reduced, the valve to employ simpler linking, a minimal size float and a reduction in the numer of parts employed. In this respect, the outlet valve which is shown generally at 36, comprises a T-shaped pipe indicated generally at 38 and consisting of a base 40 defining the outlet of the T-shaped pipe and which is threadably mounted by way of pipe fitting 42 to the endwall 24 of the steam trap housing 10. The endwall is provided with a threaded opening 44 which receives one end of the fitting 42 in horizontal alignment with the condensate outlet 32, the other end of the fitting 42 being threadably mounted by way of threaded flange portion 46 of the base 40 of the T-pipe. Additionally, the T-pipe comprises an integral vertical upper arm 48 and an integral vertically lower arm 50, the lower arm 50 being threaded on its inner surface at 52 and threadably supporting a cylindrical valve seat fitting 54. The fitting 54 terminates at its lower end in annular internal recess 56 which holds a correspondingly sized annular valve seat 58. The outlet valve 36 comprises a metal valve disc 60 whose diameter is slightly larger than that of the internal diameter of the valve seat 58, the valve disc 60 being provided with a socket element 62 at the center of its upper face which receives a ball 64 formed on the lower end of a valve actuator rod 66, thereby defining a ball and socket connection between the valve disc and the rod and insuring seating of the valve disc 60 upon closure of the valve 36. The valve rod 66 extends axially through the upper and lower arms 48 and 50 of the T-shaped pipe. Further, the balanced discharge valve 36 of the present invention comprises a float arm 68 which is pivotably mounted to the T-pipe by having one end 69 of the arm threaded and extending through an opening 70 within a U-shaped body yoke 71, and locked thereto by nut 67, the yoke 71 being mounted for pivoting about a horizontal axis by way of a float arm mounting member 72 which embraces and is fixed to the T-pipe 38. Pins 73 fixed to member 72 on opposite sides of yoke 71 define the pivot axis for arm 68. The float arm 68 is threaded at 76 to permit it to be adjustably coupled by way of a threaded connector fitting 78 to a float 80 which takes the form of a hollow ball. An inverted U-shaped bellows yoke 77 mounted to threaded upper end 88 of valve rod 66 is coupled at both sides to body yoke 71 by links 79 of metal strip form. As may be seen, the gravity accumulation of condensed water from the steam entering the condensate inlet 34 causes the hollow ball 80 floating on the water to rise, pivoting the float arm 68 clockwise about pivot pins 73 thus driving the valve actuator rod 66 vertically downwardly to move the valve disc 6 off its annular seat 58 and to permit the condensate to leave the steam trap housing through pipe base 40, cylindrical fitting 42 and the condensate outlet 32.

The simplified pressure balancing arrangement of the present invention resides in the provision of a pressure balancing plate 82 of disc shape which is mounted to the upper end of the valve actuating rod 66 by means of the threaded, reduced diameter portion 88 which projects through a hole 90 within the disc-like plate 82 and which threadably carries a nut 94 overlying yoke 77 for locking the plate 82 to the valve rod 66. Further, a tubular non-ferrous metal bellows 100 is fixedly soldered to the plate 82 which further receives the threaded rod 66. Threadably mounted within the upper end of the upper arm 38 of the T-pipe is an end plug 106 having threadably mounted therein an axially extending tubular rod guide 108, the bore 110 of which slidably carries the valve actuator rod 66. The lower end 100 of the tubular bellows is suitably, sealably affixed to the upper end of the end plug 106 by brazing or the like.

The pressure balancing plate 82 has a diameter on the order of the valve disc 60 such that the steam pressure within the steam trap housing 10 which acts on the lower face of the valve disc 60 tending to maintain the valve 36 closed similarly acts on the upper face of the pressure balancing plate 82 to balance the forces acting axially on the valve rod and permitting the float or ball 80 to move the valve disc 60 off the annular valve seat 58 with little effort. At the same time, the gas pressure within the T-pipe during valve closed conditions causes equal and opposite pressures to be exerted against on the upper face of the valve disc 60 and the lower face of the pressure balancing plate 82. Thus, internal and external pressures are equally balanced and the ball 80 rises in an unrestrained manner to pivot the float arm clockwise and to open the valve upon sufficient accumulation of liquid condensate. The tubular non-ferrous bellows 100 merely follows movement of the pressure balancing plate 82 to insure sealing of the pressure balancing plate upper surface from the interior of the condensate outlet and the lower surface of the plate from the interior of the steam trap housing. The relative surface areas of the pressure balancing plate 82 and valve disc 60 may be varied to create a perfectly balanced condition, or over and under pressure balancing with respect to the steam pressure exerted on the valve disc tending to resist opening of the valve. The thermostatic valve 28 is of the type, in the pressure of a high temperature, normally maintains the valve closed and prevents the condensate outlet 32 from being in gas communication with the interior of the steam trap housing. However, upon the introduction of air and non-condensable gases which would result in a, and increase in temperature, the valve opens to permit air and other non-condensable gases to leave the steam trap by way of the air by-pass passage 30 to the condensate outlet 32.

While the invention has been particularly shown and described with reference to a preferred embodiment thereof, it will be understood by those skilled in the art that various changes in form and details may be made therein without departing from the spirit and scope of the invention.

What is claimed is:

1. In a steam trap comprising an imperforate housing including means forming an upper steam inlet passage and a lower condensate outlet passage with said outlet passage including a fixed annular valve seat and a valve-disc mounted within said steam trap for axial movement towards and away from said valve seat to seal off the outlet passage discharge opening from the steam trap interior, and a float within the lower portion of said housing operatively connected to said valve disc for moving said valve disc away from said valve seat in response to a predetermined accumulation of liquid condensate within said housing, the improvement comprising:

a pressure balancing plate,
a valve actuating rod fixed at one end to said pressure balancing plate and fixed at the other end to said valve disc to place said pressure balancing plate and valve disc in axial alignment,
means for slidably mounting said valve actuating rod within a portion of said means defining said outlet passage, and
a bellows sealably fixed at one end to said means defining said outlet passage and extending concentrically about said valve actuating rod and being sealably fixed at the other end to the periphery of said pressure balancing plate;
said outlet passage means comprising a T-shaped pipe including a horizontal outlet base portion extending through an end wall of said housing, and integral vertical right angle arms open to the housing interior above and below said base portion, said lower arm terminating in said annular valve seat, said valve rod extending from said valve disc through said valve seat and axialy through both arms, said means operatively connecting said float to said valve disc comprising a float arm fixed at one end to said float and fixed at the other end to a body yoke encompassing said T-shaped pipe, said body yoke being pivotably coupled to said pipe and to said vertically extending valve actuator rod, and wherein said tubular bellows is sealably, fixedly mounted at its upper end to said pressure balancing plate and its lower end to the upper end of said T-shaped pipe upper arm;
whereby, the pressures acting on the valve disc in valve closed position are balanced to reduce the power necessarily exerted by the float on the valve disc to move the valve disc to valve open position.

2. The improved steam trap as claimed in claim 1, wherein a float arm mounting member embraces said pipe and is fixed thereto, said body yoke is pivoted to said float arm mounting member on respective sides of said pipe, an inverted U-shaped bellows yoke spans the upper face of said pressure balancing plate and paired links respectively couple said body yoke and said bellows yoke on opposite sides of said T-shaped pipe.

* * * * *